United States Patent [19]
LeJeune

[11] 3,736,974
[45] June 5, 1973

[54] TIRE HAVING BEAD WIRES TANGENT TO ONE ANOTHER

[75] Inventor: Daniel LeJeune, Clermont-Ferrand, France

[73] Assignee: Compagnie Generale Des Establissements Michelin, raison sociale Michelin & Cie, Clermont-Ferrand (Puy-de-Dome), France

[22] Filed: Mar. 10, 1971

[21] Appl. No.: 122,934

[30] Foreign Application Priority Data

Mar. 13, 1970  France.................................7009583

[52] U.S. Cl................................152/362 R, 245/1.5
[51] Int. Cl..............................................B60c 15/04
[58] Field of Search.....................152/362 R; 245/1.5

[56] References Cited

UNITED STATES PATENTS

| 1,147,032 | 7/1915 | McNaull | 152/362 R |
| 1,686,155 | 10/1928 | Hopkins | 245/1.5 |
| 1,715,302 | 5/1929 | Michelin | 245/1.5 |
| 2,423,995 | 7/1947 | Reynolds | 152/362 R |

FOREIGN PATENTS OR APPLICATIONS

| 1,215,793 | 4/1960 | France | 152/362 R |
| 1,465,556 | 1/1967 | France | 152/362 R |
| 1,418,887 | 10/1965 | France | 152/362 R |

*Primary Examiner*—Drayton E. Hoffman
*Assistant Examiner*—Robert Saifer
*Attorney*—Brumbaugh, Graves, Donohue & Raymond

[57] ABSTRACT

A tubeless radial truck tire is formed with an assembly of three bead wires in each bead around which the ends of the carcass ply or plies are wound. The bead wires are braided and of circular cross section and in each bead each bead wire is tangent to the other two.

10 Claims, 9 Drawing Figures

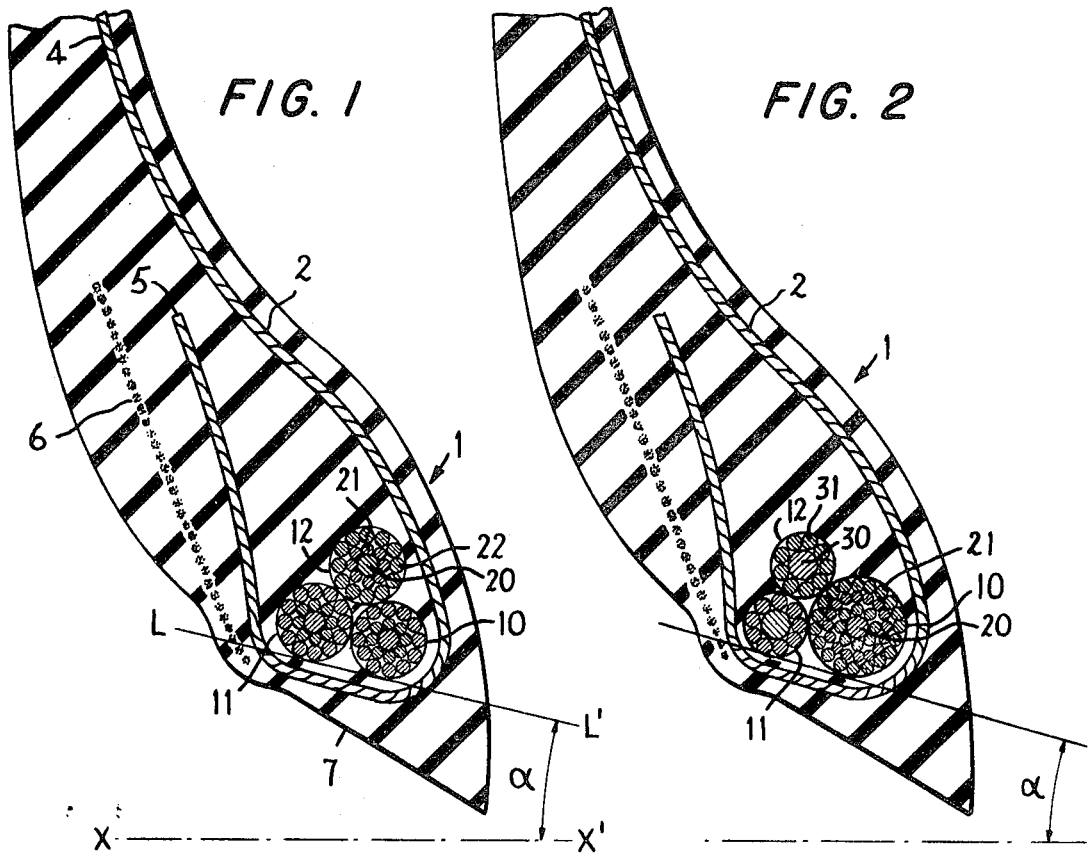
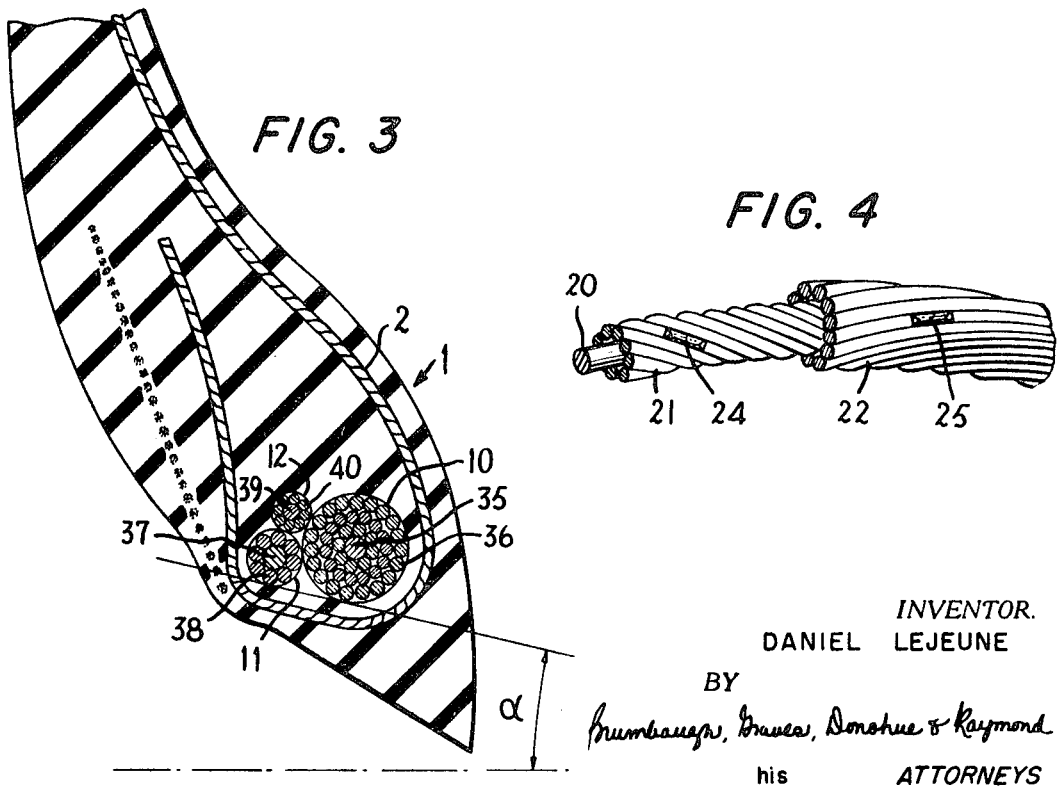

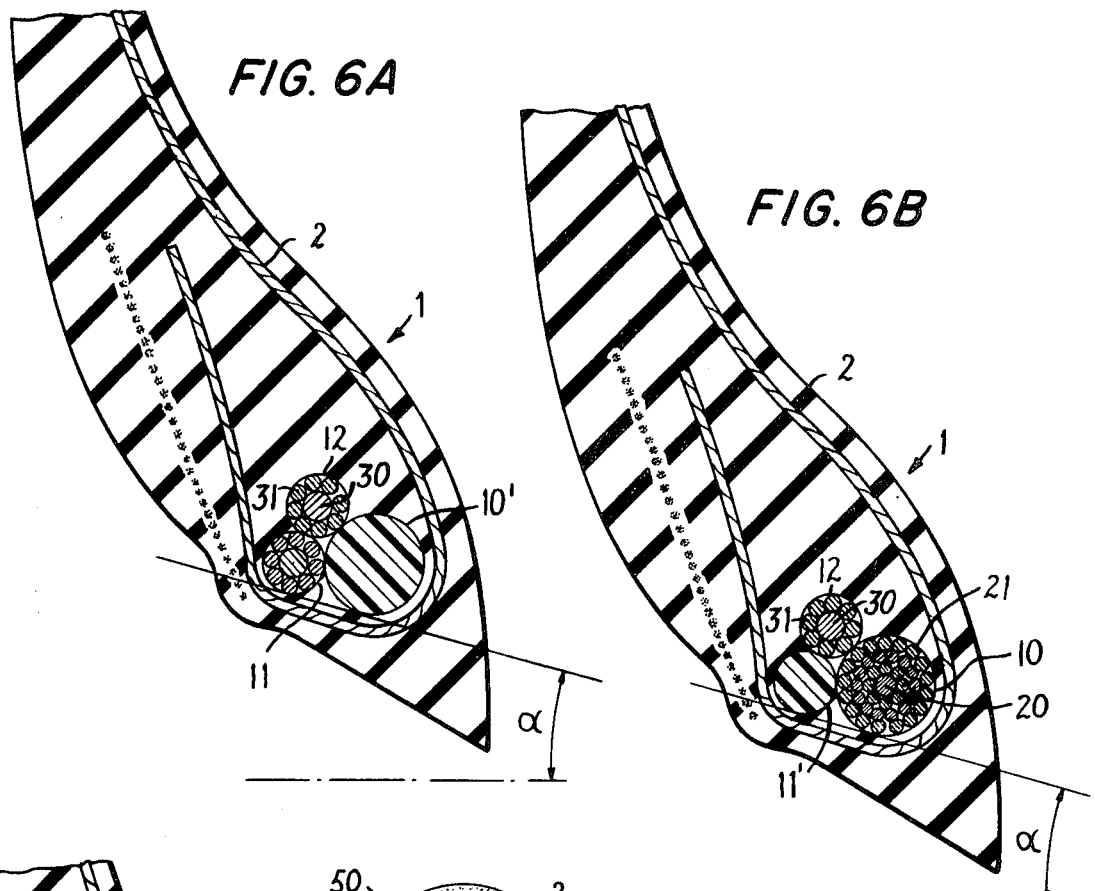
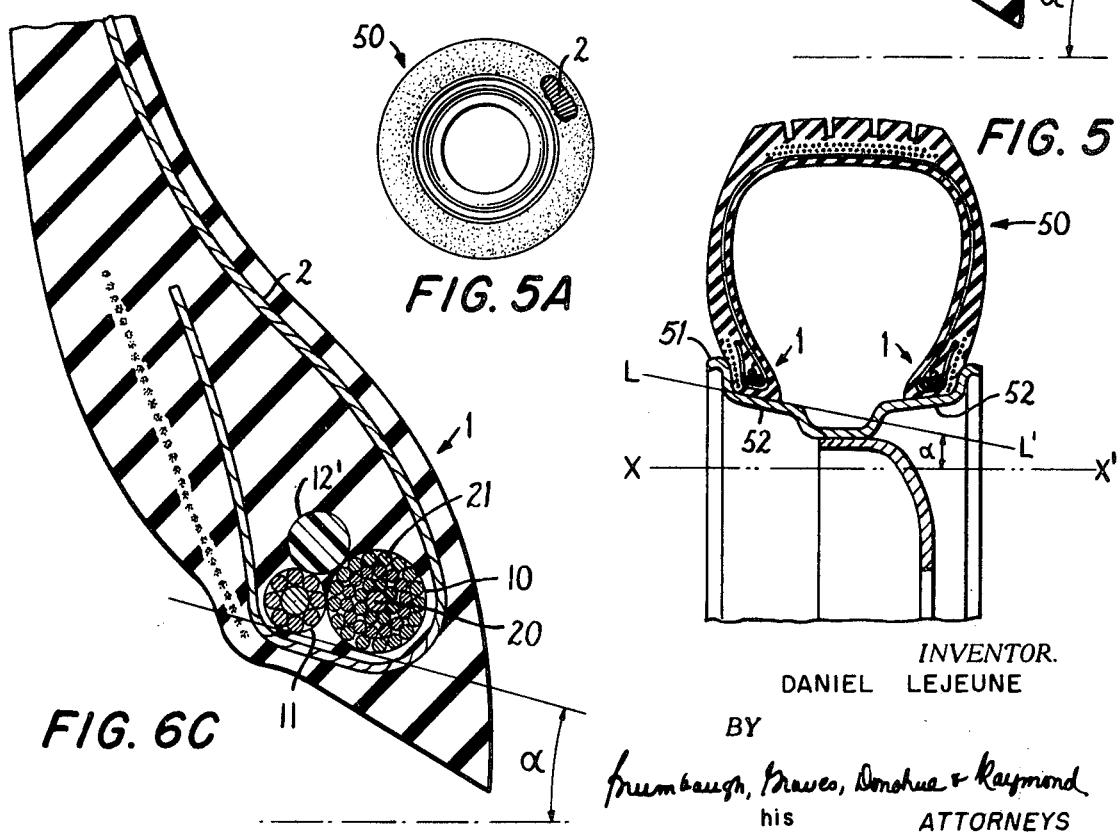

TIRE HAVING BEAD WIRES TANGENT TO ONE ANOTHER

BACKGROUND OF THE INVENTION

This invention relates to tires and, more particularly, to novel and highly-effective tubeless tires having improved bead wires. The invention is applicable especially, but not exclusively, to radial tubeless truck tires intended to be used with rims the bead seats of which are inclined at a given angle—for example 15°—to the axis of the rim.

Tires for automotive vehicles such as trucks and the like are provided in each of their beads with one or more circumferential steel bead wires. The function of these bead wires is to make the beads sufficiently inextensible for the tire to be retained on the rim, as well as to facilitate the anchoring of the carcass plies. For this reason a single bead wire per bead is generally used when the carcass of the tire is made of a single ply or of a small number of plies. On the other hand, several bead wires per bead are used when the carcass is composed of a large number of plies, each bead wire serving to anchor a separate group of plies.

Two types of bead wires are currently used, namely so-called "braided" bead wires and so-called "package" bead wires.

Braided bead wires are formed of: (1) a circular core formed of a single steel wire the ends of which have been welded together to form a ring; (2) a layer arranged around the core and formed from a steel wire helically wound on the core so as to form a plurality of helices which are juxtaposed and which cover the entire core, the two ends of the wire being then connected; and (3) possibly other layers formed like the first layer (element (2) above), each by means of a single steel wire wound around the core and the layer or layers which have already been applied. Braided bead wires obviously have a substantially circular cross section. They can be compared with a cable forming a closed loop, with the difference, however, that each layer is composed of a single continuous steel wire and not of a plurality of wires.

Package bead wires are obtained from a steel wire which is wound in such a manner as to form a large number of substantially circular turns adjoining each other which form successive layers. These bead wires have a cross section of any shape, for instance the shape of a rectangle, parallelogram, hexagon, etc. Such bead wires are obtained by winding the wire on the inside of an annular form having a cross section of suitable shape.

Thus, in braided bead wires the turns are helicoidal and interlaced and produce a circular structure, while in package bead wires the turns are circular and merely juxtaposed and produce a cross section of any shape. This difference in structure results, of course, in differences in properties.

Essentially, package bead wires are practically nondeformable but, despite this rigidity, have relatively low tensile strength per unit cross sectional area of metal. Furthermore, above a certain value of the cross sectional area of metal, the tensile strength is practically not increased at all by increasing the number of turns (and therefore the cross sectional area of metal). On the other hand, braided bead wires are flexible—in a manner similar to metal cables—and, despite this flexibility, have a much better tensile strength per unit cross sectional area of metal. Their tensile strength furthermore increases continuously with increasing cross sectional area of metal.

The superiority of braided bead wires explains why they are preferred for quality tires such as radial tires. However, there is one case in which up to now the package bead wire has been preferred: namely, radial tires intended to be used without inner tubes on rims the bead seats of which form a marked angle—say 15°—with the axis of the rim. In this case a tight wedging of the bead on the rim is necessary and braided bead wires, because of their flexibility, might cause the tire to come off the rim under certain circumstances. However, the use of package bead wires has a twofold drawback in this case: namely, the tensile strength is limited and the rigidity of the bead wire results in circular breaks in the bead at the location of the end of the turnaround of the carcass ply.

SUMMARY OF THE INVENTION

An object of the present invention is to overcome the drawbacks of conventional package bead wires and conventional braided bead wires and provide a new type of bead reinforcement which rigidifies the bead, although not excessively; which makes it possible to increase the tensile strength of the bead as desired by increasing the metal cross sectional area of the bead wire; which reduces or eliminates the risk of the tire coming off the rim; and which eliminates, reduces or delays the formation of circular cracks in the bead at the level of the end of the turnaround of the carcass ply.

The foregoing and other objects are attained in accordance with the invention by the provision of a tire having beads provided with inextensible steel bead wires around which the carcass ply or plies are wound. More particularly, each bead comprises three braided bead wires of circular section, each tangent to the other two, the carcass ply or plies being wound around the assembly of the three bead wires.

In a preferred embodiment, in each bead the two bead wires closest to the base of the bead are tangent to an imaginary surface which is substantially parallel to the surface on which the base of the bead is intended to rest. Thus, if the tire is intended to be used on a rim the seats of which are inclined by an angle $\alpha$—for instance 15°—to the axis of the rim, the bead wires closest to the base of the bead are tangent to a cone half the vertex angle of which is equal to $\alpha$ (or close to $\alpha$) and the axis of which coincides with the axis of the tire. Similarly, if the tire is intended to be used on a flat rim, the bead wires closest to the base of the bead are tangent to a cylinder the axis of which coincides with the axis of the tire.

The configuration formed by three circular bead wires which are tangent to one another in pairs is relatively nondeformable; in radial section the centers of the three bead wires form a triangle, which, of course, is a nondeformable figure. The result is that three bead wires arranged as indicated form an assembly which is definitely more rigid than the assembly formed by the same three bead wires arranged without triangulation and also more rigid than a single bead wire or an assembly of two bead wires using the same amount of metal.

The parallelism of the bead seat with the imaginary surface tangent to the base of the assembly of the three bead wires furthermore favors the wedging of the bead on its seat.

The three bead wires may have radial sections of identical areas and be composed of the same elements. However, this embodiment is not the best one since in such an assembly each bead wire will not work in identical fashion. In order to obtain maximum tensile strength it is advisable to proportion the diameter of each bead wire to the extent to which it contributes to the overall strength. This leads to the use of bead wires of unequal cross sections.

The manufacture of a tire in accordance with the invention does not present any particular difficulties. The three braided bead wires are made in a conventional manner, the proper dimensions being selected for each of them (diameter of the cross section, development of the bead wire). The three bead wires are then assembled by any means (collars, winding around them of a wire, a strap, a spiral band, bonding with an adhesive, particularly by means of rubber, etc.) so as to retain the desired geometrical configuration during the tire-making operations. These fasteners remain in the finished tire but are not intended to play any role once the bead wires are covered with rubber, surrounded by the carcass ply or plies and incorporated in the beads.

Alternatively, one can, before assembling the three bead wires in accordance with the invention, cover one or more of them with a layer of rubber. However, it is preferable that the bead wires contact each other via their individual metal wires.

One can also use an assembly of more than three braided bead wires. However, a priori, no advantage in this arrangement can be noted.

On the other hand, one can use an assembly of two bead wires, tangent to each other and to a conical surface parallel to the bead seat. In this case the third bead wire can be replaced by a "bead wire" consisting of a ring or an annular ferrule preferably of rigid material (hard rubber, plastic, etc.). However, this embodiment provides only a part of the advantages of the present invention.

BRIEF DESCRIPTION OF THE DRAWING

An understanding of other aspects of the invention can be gained from a consideration of the following detailed description of several representative embodiments thereof in conjunction with the appended figures of the drawing, wherein:

FIGS. 1–3 and 6A, 6B and 6C are fragmentary radial sectional views of the bead portions of several embodiments of a tubeless tire in accordance with the invention;

FIG. 4 is a perspective view, partially broken away of a braided bead wire of the type used in the tires of FIGS. 1–3;

FIG. 5 is a radial sectional view on a small scale of a tire in accordance with the invention mounted on a wheel; and FIG. 5A is a partly broken away elevational view of the tire of FIG. 5, on a still smaller scale.

DESCRIPTION OF THE PREFERRED EMBODIMENTS

FIGS. 1–3 show a bead 1 of a tire of size 11 × 22.5 comprising a carcass ply 2 the wires of which are arranged radially (see also FIG. 5A) and on one side extend at 4 into the sidewall and on the other side stop at 5 in the bead. The bead also comprises a stiffener 6.

The base 7 of the bead is inclined to the axis of the tire whose direction is indicated by the line X–X'.

The bead comprises an assembly of three braided bead wires 10, 11, 12 which are tangent in pairs: i.e., each is tangent to the other two. The bead wires 10 and 11 closest to the base of the bead are tangent to a conical surface the intersection of which with the plane of the figure is indicated by the line L–L'. The angle between the lines L–L' and X–X' is 15°.

In FIG. 1 the three bead wires have an identical structure and comprise:
 a mild steel core made of a steel wire 20 of a diameter of 2.15 mm,
 a first layer of eight steel wires 21 of a diameter of 1.30 mm,
 a second layer of twelve steel wires 22 of a diameter of 1.55 mm.

The interior developments or interior circumferential lengths of the three wires 10, 11 and 12 (that is to say, the circumferences of the internally tangent cylinders centered on the tire axis) are 1,788, 1,801 and 1,836 mm, respectively, the diameter of each wire being about 8 mm. FIG. 4 shows the respective arrangement of the core 20 and of the wires 21 and 22. As has been explained, each of the eight wires 21 and of the 12 wires 22 is actually a portion of one and the same continuous wire the ends of which are connected at 24 and 25 by means of a crimped-on sleeve. The wires 21 and 22 are wound respectively in the Z-direction and the S-direction.

FIG. 2 shows a slightly different arrangement of the braided bead wires 10, 11 and 12. The bead wire 10 has a diameter of 10.2 mm, while the bead wires 11 and 12 have identical structures and a diameter of 6.1 mm.

The bead wire 10 comprises a core 20 of a diameter of 2.15 mm and three layers of eight, 14 and 19 wires, respectively, of a diameter of 1.30 mm.

The bead wires 11 and 12 have a core 30 of 3 mm and a layer of nine wires 31 of 1.55 mm diameter.

The inner developments of the three bead wires 10, 11 and 12 are again 1,788, 1,801 and 1,836 mm, respectively.

FIG. 3 shows an arrangement of braided bead wires 10, 11 and 12, all three of different cross section.

The bead wire 10 comprises a core 35 of 3 mm diameter and three layers of wires 36 of 1.55 mm diameter, numbering eight, 14 and 20 in the successive layers. The diameter of the bead wire is 12.1 mm.

The bead wire 11 comprises a core 37 of 2.15 mm and a layer of eight wires 38 of 1.30 mm. The diameter of the bead wire is 4.8 mm.

The bead wire 12 comprises a core 39 of 1.55 mm and a layer of seven wires 40 of 1 mm. Its diameter is 3.5 mm.

The inner developments of the three bead wires 10, 11 and 12 are 1,788, 1,801 and 1,830 mm, respectively.

The three examples given all use an assembly of three bead wires comprising practically the same amount of metal, this amount being 22 percent less than that used on "package" wires.

Despite this substantial decrease in weight, the assembly of FIG. 2 gives a tensile strength equal to that of the "package" bead wires. The assemblies of FIGS. 1 and 3 show a decrease in the tensile strength of the order of only 10 percent, despite a decrease in the quantity of metal of more than 20 percent.

Truck tires of size 11 × 22.5 X T comprising in their beads triangulated braided bead wires in accordance with the examples shown in the drawings, mounted on rims with bead seats inclined 15°, have many advantages: they are secured on their rims better than tires with package bead wires or single braided bead wires; they do not show circular cracks at the place of the turnaround of the carcass. The triangulated braided bead wire constitutes an excellent compromise between rigidity and mobility.

A tire 50 whose beads 1 are formed in accordance with the invention is shown in FIG. 5. It is mounted on a wheel whose rim 51 has two seats 52 inclined by an angle $\alpha$ equal to 15° to the axis of the wheel the direction of which is indicated by the line X–X'.

FIGS. 6A, 6B and 6C show, respectively, the substitution of hard rubber or plastic "bead wires" 10', 11', and 12' for the bead wires 10, 11, and 12.

Thus there is provided in accordance with the invention a novel and highly-effective tire making tubeless radial tires well adapted for use on trucks. Many embodiments of tires within the spirit and scope of the invention will readily occur to those skilled in the art upon study of the present disclosure. Accordingly, the invention is to be construed as including all of the embodiments within the scope of the appended claims.

I claim:

1. A tubeless tire comprising a pair of beads, at least one carcass ply, and an assembly of three bead wires in each bead, an end of said carcass ply being wound around each assembly of bead wires, at least two of the three bead wires in each bead being made of steel, of braided construction, and of circular cross section, and each of the three bead wires in each bead being tangent to the other two.

2. A tubeless tire according to claim 1 wherein two of said bead wires in each bead adjacent to the base of the bead are tangent to an imaginary surface substantially parallel to the surface on which the base of the bead is intended to rest.

3. A tubeless tire according to claim 1 wherein two of said bead wires in each bead adjacent to the base of the bead are tangent to an imaginary conical surface whose axis coincides with the axis of the tire and the half-angle of the vertex of which is substantially 15°.

4. A tubeless tire according to claim 1 wherein each of said three bead wires in each bead is of the same structure and cross section.

5. A tubeless tire comprising a pair of beads, at least one carcass ply, and an assembly of three substantially inextensible steel bead wires in each bead, an end of said carcass ply being wound around each assembly of bead wires, each of the three bead wires in each bead being braided, of circular cross section, and tangent to the other two, two of said three bead wires in each bead being of the same structure and cross section and the third bead wire in each bead having a larger cross section.

6. A tubeless tire comprising a pair of beads, at least one carcass ply, and an assembly of three substantially inextensible steel bead wires in each bead, an end of said carcass ply being wound around each assembly of bead wires, each of the three bead wires in each bead being braided, of circular cross section, and tangent to the other two, and each of said three bead wires in each bead having a structure and cross section different from those of the other two bead wires in the same bead.

7. A tubeless tire comprising a pair of beads, at least one carcass ply, and an assembly of three substantially inextensible steel bead wires in each bead, an end of said carcass ply being wound around each assembly of bead wires, each of the three bead wires in each bead being braided, of circular cross section, and tangent to the other two, and each of said three bead wires in each bead having a structure and cross section different from those of the other two bead wires in the same bead, the cross section of each bead wire in each bead being proportional to the force which it withstands.

8. A tubeless tire comprising a pair of beads, at least one carcass ply, and an assembly of three bead wires in each bead, an end of said carcass ply being wrapped around each assembly of bead wires, two bead wires in each bead being made of steel and being braided and of circular cross section, the third bead wire in each bead being formed of a rigid, nonmetallic material, and two of said bead wires in each bead adjacent to the base of the bead being tangent to an imaginary surface substantially parallel to the surface on which the base of the bead is intended to rest.

9. A tubeless tire according to claim 8 wherein said rigid, nonmetallic material is hard rubber.

10. A tubeless tire according to claim 8 wherein said rigid, nonmetallic material is plastic.

* * * * *